N. PLYMPTON.
Tea-Kettles.
No. 144,698.
Patented Nov. 18, 1873.
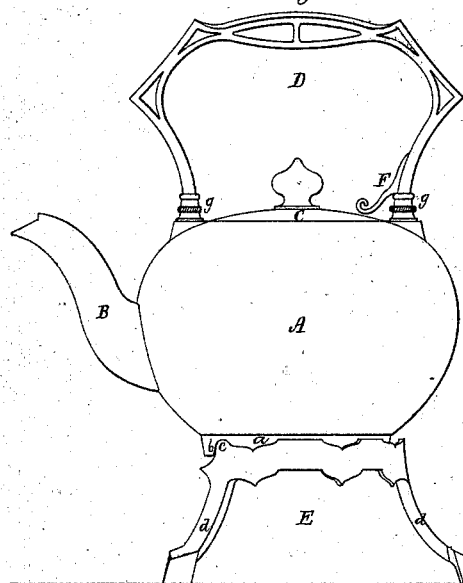
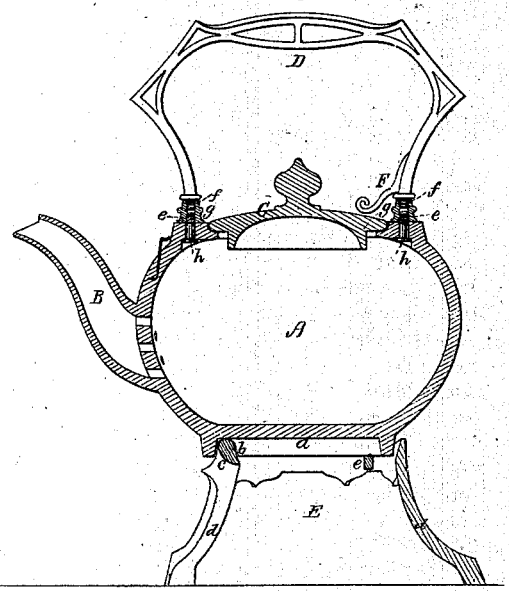
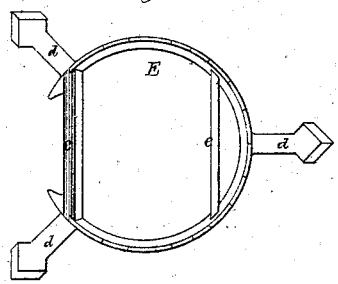
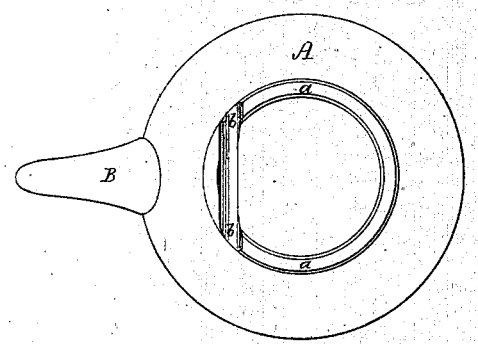
Witnesses
S. N. Piper
J. R. Snow
Nathaniel Plympton.
by his attorney
R. H. Eddy

UNITED STATES PATENT OFFICE

NATHANIEL PLYMPTON, OF BOSTON, MASSACHUSETTS.

IMPROVEMENT IN TEA-KETTLES.

Specification forming part of Letters Patent No. 144,698, dated November 18, 1873; application filed June 12, 1873.

*To all whom it may concern:*

Be it known that I, NATHANIEL PLYMPTON, of Boston, of the county of Suffolk and State of Massachusetts, have invented a new and useful Improvement in Tea-Pots or Water-Kettles; and do hereby declare the same to be fully described in the following specification and represented in the accompanying drawings, of which—

Figure 1 is a side elevation, and Fig. 2 a longitudinal section, of one of my improved tea-pots or water-kettles. Fig. 3 is a top view of the stand for supporting the body of the kettle or pot. Fig. 4 is a bottom view of the said body.

In such drawings, A denotes the body, B the nose, C the cover, and D the handle, of the kettle, they being made in the ordinary way, except that the base part $a$ of the body is grooved or notched at its front part and across the same, as shown at $b\ b$, to receive and rest upon a raised pivotal chord, $c$, of the tripod or stand E, such stand being the segment of a circular ring, provided with three legs, $d\ d\ d$, arranged as shown, and also with a back rest or bar, $e$, extended across it parallel to the raised chord $c$, all being as represented. The cover projects into the mouth of the body, and is flanged, as usual, to rest on the top of such body, all being as shown in the drawings. While the body is being tipped the part of the cover projecting into the mouth of the body will act in conjunction with the single cover-guard F, to prevent the cover from falling out of place or off the mouth. It will be observed that the cover is not pivoted or hinged to the body. From the handle a cover-guard, F, projects down over and nearly to the cover, in manner as shown, it being to keep the cover from falling off its seat, while the body may be in the act of being tipped forward on the pivotal chord $c$. The body, nose, and cover I usually make of porcelain or earthenware, and the handle and guard and the stand of brass, or other proper material. The handle I connect with the body by two right-threaded screws, $e\ e$, provided with heads $h\ h$, and by left screws $f\ f$ on the ends of the handle, and by two couplings, $g\ g$, each formed with one right and one left female screw, to engage with the screws $e\ f$, all being arranged as shown.

I make no claim to a hinged handle or bail and two arms fixed thereto for holding down the cover of the kettle when the bail is turned up and turning down with the bail, the cover in such case being capable of being removed from the pot only when the bail is turned down, all being as described and represented in the United States Patent No. 86,008.

In my improved kettle or pot the handle is stationary relatively to the pot or body, and but one cover-guard, F, is used, such serving to prevent the cover from accidental displacement while the pot is being tipped forward, but enabling the cover to be easily removed at other times from the body.

I claim as my invention—

1. In the tea-pot or water-kettle, as described, the stationary handle provided with the single cover-guard F, arranged to project from it and over the cover, in manner and for the purpose as set forth, in combination with such cover, separate from and made so as to rest upon and extend into the body, as represented and described.

2. The stand provided with the circular segmental top and pivotal chord, as described, and with the back bar, arranged as set forth, in combination with the base of the kettle notched to receive the pivotal chord, as shown and described.

NATHL. PLYMPTON.

Witnesses:
   R. H. EDDY,
   J. R. SNOW.